United States Patent
Olsson et al.

(10) Patent No.: US 6,723,154 B2
(45) Date of Patent: Apr. 20, 2004

(54) METHOD AND DEVICE FOR CLEANING AIR IN A COMPRESSED AIR SYSTEM

(75) Inventors: Mats Olsson, Staffanstorp (CH); Mats-Orjan Pogen, Billeberga (CH)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 10/121,529

(22) Filed: Apr. 12, 2002

(65) Prior Publication Data

US 2002/0194991 A1 Dec. 26, 2002

Related U.S. Application Data

(63) Continuation of application No. PCT/SE00/01974, filed on Oct. 12, 2000.

(30) Foreign Application Priority Data

Oct. 14, 1999 (SE) ................................................ 9903692

(51) Int. Cl.[7] .............................................. B01D 53/26
(52) U.S. Cl. ............................. 95/118; 95/287; 95/902; 96/132; 96/134; 55/487; 55/DIG. 17
(58) Field of Search .......................... 96/121, 131, 132, 96/134, 147; 95/90, 117, 118, 273, 286, 287, 902; 55/385.2, 487, DIG. 17

(56) References Cited

U.S. PATENT DOCUMENTS

| | | | | | |
|---|---|---|---|---|---|
| 3,464,186 A | * | 9/1969 | Hankison et al. | ............. | 96/115 |
| 3,555,787 A | | 1/1971 | Lustig | ............ | 55/179 |
| 3,906,798 A | * | 9/1975 | Dray | ............ | 73/384 |
| 4,029,486 A | * | 6/1977 | Frantz | ............ | 96/137 |
| 4,572,725 A | * | 2/1986 | Kojima | ............ | 96/137 |
| 4,604,110 A | * | 8/1986 | Frazier | ............ | 95/128 |
| 5,451,248 A | | 9/1995 | Sadkowski et al. | ............ | 95/99 |
| 5,607,500 A | * | 3/1997 | Shamine et al. | ............. | 96/144 |
| 6,076,272 A | * | 6/2000 | Conklin et al. | ............. | 34/80 |

FOREIGN PATENT DOCUMENTS

| | | |
|---|---|---|
| EP | 0 490 632 B1 | 6/1992 |
| WO | WO 99/47240 | 9/1999 |

* cited by examiner

*Primary Examiner*—Frank M. Lawrence
(74) *Attorney, Agent, or Firm*—St. Onge Steward Johnston & Reens LLC

(57) ABSTRACT

Air in a compressed air system is cleaned by consecutively passing the air through a pre-filter, silica gel with large pores, silica gel with fine pores, a molecular sieve, and a fine filter.

7 Claims, 1 Drawing Sheet

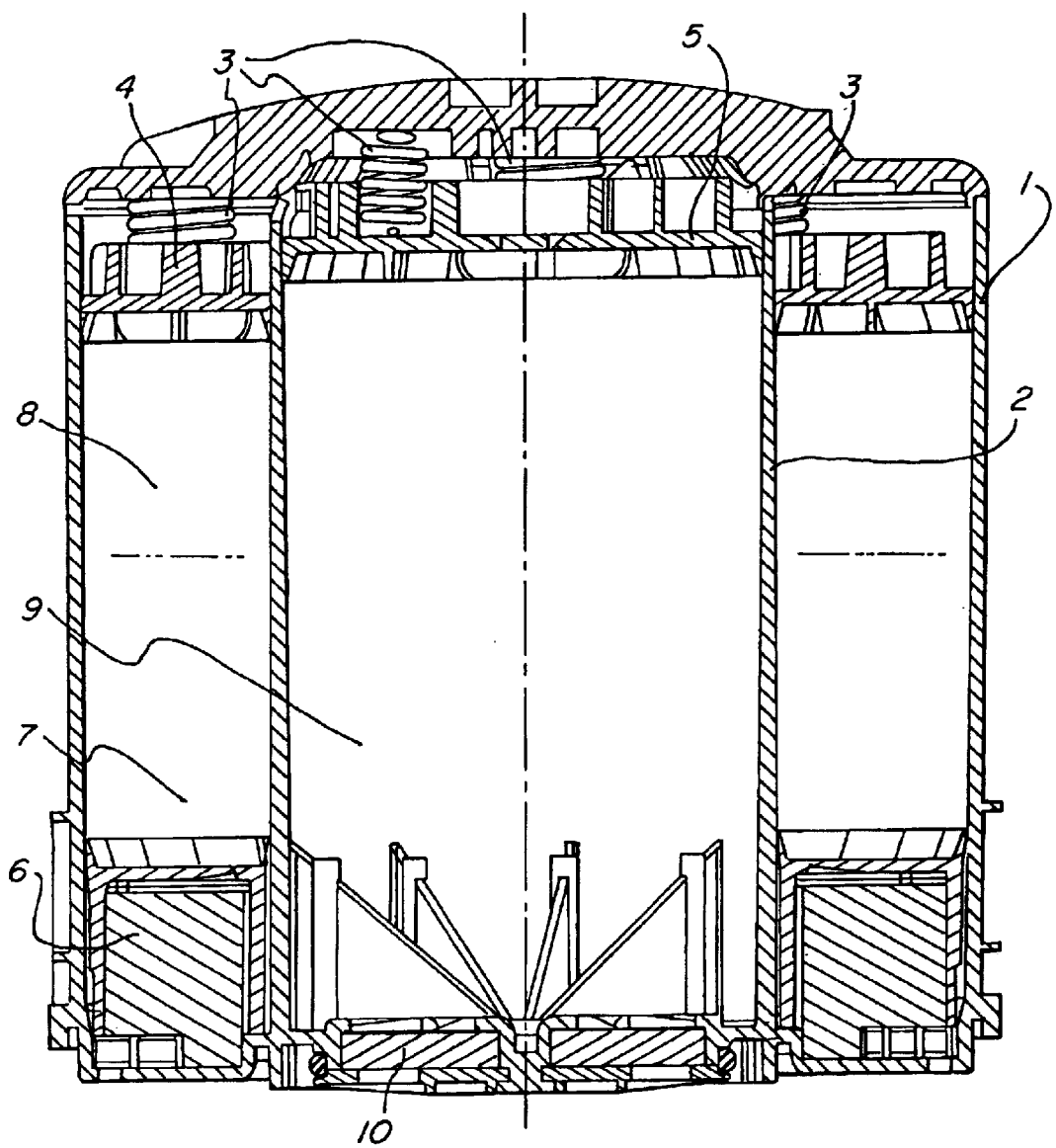

METHOD AND DEVICE FOR CLEANING AIR IN A COMPRESSED AIR SYSTEM

This application is a continuation of pending International Application PCT/SE00/01974 filed Oct. 12, 2000, which designates the United States and claims priority of Swedish Application 9903692-3 filed Oct. 14, 1999.

FIELD OF THE INVENTION

The present invention relates to a method of cleaning air in a compressed air system. It also relates to a use of this method as well as a device for carrying out the method.

BACKGROUND OF THE INVENTION

A compressor delivers air to the compressed air system. This air is conventionally passed through an air dryer, where the air is dried by means of desiccant or molecular sieve.

However, the air coming from the compressor is a mixture of gas, solid particles and liquid particles. The mixture is called an aerosol. The size of the particles can typically be in the range of 0.001–15 $\mu$m. The particles can form larger clods, so called agglomerates. Larger liquid particles can be mechanically trapped.

Some of the particles are already in the air fed into the compressor, whereas others are added in the compressor, especially if it is of the piston type (where lubricating oil will be added to the air).

The molecular sieve has the purpose to take up moisture and is cyclically regenerated for removing this moisture. It is, however, well known that all other matter introduced therein by the air is detrimental for its function, so that it has to be replaced at intervals. Also, the air leaving the molecular sieve will contain matter that can cause problems and damages in the compressed air system, and this problem is increased with the ageing of the molecular sieve.

SUMMARY OF INVENTION

The main object of the invention is accordingly to remove the above stated deficiencies with presently used air drying systems and to obtain a cleaning rather than a mere drying of the air delivered to the compressed air system.

This is according to the invention attained by consecutively passing the air through at least one of the following media in addition to a molecular sieve:

a pre-filter,
silica gel, and
a fine filter,
wherein the pre-filter and the silica gel are upstream from the molecular sieve and the fine filter downstream thereof.

Preferably, the air is consecutively passed through the pre-filter, the silica gel, the molecular sieve, and the fine filter.

The method according to the invention is preferably to be used in compressed air systems for automotive application, especially for heavy road vehicles, but other uses are equally possible.

A conventional cartridge for an air dryer has a cylindrical housing provided with a cylindrical wall dividing the housing in an annular outer compartment and a cylindrical central compartment. In this cartridge the pre-filter and the silica gel can be arranged in the outer compartment and the molecular sieve and the fine filter in the central compartment.

BRIEF DESCRIPTION OF THE DRAWING

The invention will be further described below under certain reference to the accompanying drawing showing a sectional view through an air dryer cartridge for a vehicle air dryer.

DETAILED DESCRIPTION OF THE DRAWING

A cartridge shown in the drawing is primarily intended for conventional arrangement in an air dryer for a compressed air system in a heavy road vehicle. The cartridge as such, the air dryer, and the compressed air system are conventional and do not per se form any part of the present invention.

The cartridge shown in the drawing will only be very briefly described. It has a cylindrical housing 1, for example made of a plastic material. As is well known to any person skilled in the art, this cartridge housing 1 is to be arranged on a base member (not shown) and in a canister (not shown) of the air dryer.

The cylindrical cartridge is divided into two compartments—a cylindrical central compartment and an annular outer compartment—by a cylindrical dividing wall 2. The central compartment may have a volume corresponding to half of that of the outer compartment, but other proportions are possible.

Provisions are made in the base member of the air dryer to allow air into and out of the two compartments in the lower region but also between the two compartments in the upper region of the cartridge.

Compression springs 3 are arranged between a top end of the housing 1 and movable covers 4 and 5 in the outer and the central compartments, respectively. The purpose of these springs is to keep the contents of the compartments under certain compression.

In the present case air to be dried is admitted into the cartridge at the bottom end of the outer compartment and exits from the cartridge at the bottom end of the central compartment.

During its way through the cartridge the air will in this case pass through the following cleaning and drying materials to be further described below:

a pre-filter 6, which will prevent larger particles, water, and liquids from passing, silica gel with large pores 7; this will prevent larger carbon compounds and other chemical compounds from passing and will take up water in liquid form; also the molecular sieve (vide below) will be protected against chemical decomposition, silica gel with fine pores 8; this will prevent smaller carbon compounds from passing and will take up water in vapor form; also the molecular sieve will be protected from exposure to free water, desiccant or molecular sieve 9; removes the remaining moisture from the air and lowers the dew point maximally, a fine filter 10, which takes up small particles generated in earlier portions of the air dryer.

The air delivered to the air dryer emanates from a compressor. Air from compressors, especially piston compressors, is a mixture of gas, solid particles and/or liquid particles. Such a mixture is called an aerosol.

The size of the particles may typically but not exclusively vary between 0.001 $\mu$m and 15 $\mu$m. The particles may be agglomerated into larger clods.

The particle concentration varies with the particle size and seems to be at a maximum for 0.4 $\mu$m particles. The highest determined number of particles is 140 000 000 particles/m$^3$ air.

The majority of the particles are carbon particles, but there are also among others sulfur and nitrogen particles. In combination with water these substances form different chemical compounds, such as nitrous acid, sulfurous acid, nitrogen compounds and a number of hydrocarbon compounds. Different types of ester compounds are also formed.

The contaminants (the chemical compounds) attack the molecular sieve in the cartridge as well as details made by rubber or plastic material in the compressed air system of the vehicle.

The contaminants clog the molecular sieve, and its ability to adsorb moisture is decreased or is totally eliminated. The molecular sieve is also broken down in its constituent parts, so that dust is formed. The dust in turn clogs filters and can also reach the compressed air system, where it may cause great and expensive damages. Clogged filters will increase the pressure drop over the molecular sieve and impair the regeneration. The result will be a shortened lifetime for both the molecular sieve and other components.

When polymer materials are exposed to the different chemical compounds, their properties may change drastically. The materials can be dissolved, swell, shrink, or change in other ways. This results in leakage, increased friction and partly or totally failing function.

The Pre-Filter 6

The purpose of this filter is to prevent great particles (agglomerates), free water, and other occurring liquids/substances from directly passing the filter and getting in contact with subsequent molecular sieve. A presently used filter has only limited efficiency for particles smaller than 5 $\mu$m, but continued work is aiming at developing a filter with effect also for smaller particles. Tests have shown an efficiency of 50% for 5 $\mu$m particles.

Silica Gel 7 and 8

Silica gel is a porous, granular, amorphous form of silicic acid or silica and is synthetically manufactured by chemical reaction between sulfuric acid and sodium silicate (99.7 weight % $SiO_2$).

The important characteristics of silica gel are that it is chemically inert, non-poisonous, and crush resistant and has a high adsorption capability on high polar liquids, such as alcohols, esters, aldehydes, ketones, and organic acids. Silica gels come in pore sizes of 20–140 Å.

It is not suitable to use only silica gel as desiccant, if a good drying capability is to be maintained. Silica gel with fine pores has a relatively good water adsorption capability, but certain types will be totally dissolved when exposed to free water. Silica gel with large pores, on the other hand, has a barrier effect, which means that it can adsorb quite a lot of moisture and has a relatively high resistance against free water, whereas the dew point suppression is very low. Silica gel with large pores has theoretically the capability to adsorb hydrocarbon compounds in size C6 and greater, whereas silica gel with fine pores can adsorb such compounds in size C4–C8.

It is hard to draw a definite line between silica gels with large and small pores, but the pore size of the silica gel with large pores used in practical tests has been 120–130 Å.

Performed tests show that the use of silica gel with large pores can reduce the amount of hydrocarbon compounds that reach the molecular sieve in size C8–C17 with some 80%, and in size C6–C7 with some 35%, whereas hydrocarbon compounds of size less than C6 pass through practically without reduction.

Tests are presently being performed in order to assess the effect of silica gel with fine pores.

Molecular Sieve 9

The desiccant material or molecular sieve used may be zeolite (but alternatives are possible). As is known in the art, zeolites are crystalline, sodium, potassium or calcium ions. The type used is $Na_{12}[(AlO_2)_{12}(SiO_2)_{12}]27H_2O$. The pore size is 4 Å, and its foremost capability is to adsorb moisture. The main drawbacks with molecular sieve is that it may be disintegrated by mechanical action in free water and that it is chemically broken down by hydrocarbon compounds and is clogged by oils and the like.

Fine Filter 10

The purpose of the fine filter is to take care of particles generated in or present in the molecular sieve and thus to prevent them from proceeding to the compressed air system. It can be manufactured by several types of material. Practically, use is made of a polyester filter. Alternatively, filters of polypropylene, wool, and viscose can be used. The filters may have an efficiency of at least some 30% for 0.4 $\mu$m particles at the flow rates occurring in the cartridge.

Modifications are possible within the scope of the appended claims. For example, the silica gel with fine pores 8 may have an effect of collecting carbon compounds in size C4–C6 also when placed after the molecular sieve 9.

What is claimed is:

1. A method of cleaning air in a compressed air system, characterized by consecutively passing the air through the following media:
   a pre-filter,
   silica gel,
   a molecular sieve and
   a fine filter,
   characterized in that use is made of silica gel with large pores for preventing larger carbon compounds and other chemical compounds from passing and for taking up water in liquid form and of silica gel with fine pores for preventing smaller carbon compounds from passing and for taking up water in vapor form.

2. A method according to claim 1, characterized in that the pre-filter, which has the purpose of preventing larger particles, free water, and liquids/substances from passing, has a good efficiency for larger particles, such as larger than 5 $\mu$m, but limited efficiency for smaller particles.

3. A method according to claim 1, characterized in that the silica gel with larger pores has a typical pore size of 120–130 Å.

4. A method according to claim 1, characterized in that the molecular sieve in a per se known way is zeolite.

5. A method of cleaning air in a compressed air system, characterized by consecutively passing the air through the following media:
   a pre-filter,
   silica gel,
   a molecular sieve and
   a fine filter,
   characterized in that the fine filter, which has the purpose of taking up small particles generated in previous media, is manufactured by polyester or alternatively by polypropylene, wool, and viscose and has a typical efficiency of at least 30% for 0.4 $\mu$m particles.

6. A method of cleaning air in a compressed air system, characterized by consecutively passing the air through the following media:

a pre-filter, silica gel, a molecular sieve and a fine filter, characterized in the said method is used in a compressed air system for automotive application.

7. A device for carrying out a method of cleaning air in a compressed air system, characterized by consecutively passing the air through the following media: a pre-filter, a silica gel, a molecular sieve and a fine filter, in which a cartridge, which is intended for a conventional air dryer to be mounted in the compressed air system after the compressor, has a cylindrical housing provided with a cylindrical dividing wall dividing the housing in an annular outer compartment and a cylindrical central compartment, characterized in that the pre-filter and the silica gel are arranged in the outer compartment and the molecular sieve and the fine filter in the central compartment.

* * * * *